US011793280B2

(12) United States Patent
Grozel et al.

(10) Patent No.: US 11,793,280 B2
(45) Date of Patent: *Oct. 24, 2023

(54) METHOD FOR CONFIGURING A WRISTWATCH STRAP

(71) Applicant: ROLEX SA, Geneva (CH)

(72) Inventors: Clément Grozel, Valleiry (FR); Franck Haegy, Chilly (FR); Julien Jaffré, Habère-Lullin (FR)

(73) Assignee: ROLEX SA, Geneva (CH)

( * ) Notice: Subject to any disclaimer, the term of this patent is extended or adjusted under 35 U.S.C. 154(b) by 114 days.

This patent is subject to a terminal disclaimer.

(21) Appl. No.: 17/295,165

(22) PCT Filed: Nov. 25, 2019

(86) PCT No.: PCT/EP2019/082453
§ 371 (c)(1),
(2) Date: May 19, 2021

(87) PCT Pub. No.: WO2020/109245
PCT Pub. Date: Jun. 4, 2020

(65) Prior Publication Data
US 2022/0007798 A1   Jan. 13, 2022

(30) Foreign Application Priority Data

Nov. 26, 2018 (EP) ...................... 8208366

(51) Int. Cl.
*G06K 9/00* (2022.01)
*A44C 5/08* (2006.01)
(Continued)

(52) U.S. Cl.
CPC ................ *A44C 5/08* (2013.01); *A44C 5/246* (2013.01); *G04B 37/1486* (2013.01); *G06T 7/62* (2017.01);
(Continued)

(58) Field of Classification Search
None
See application file for complete search history.

(56) References Cited

U.S. PATENT DOCUMENTS

| 5,771,543 A | 6/1998 | Froidevaux et al. |
| 10,692,237 B2 * | 6/2020 | Sompura .................. G06T 7/62 |

(Continued)

FOREIGN PATENT DOCUMENTS

| CN | 104820498 A | 8/2015 |
| CN | 106373085 A | 2/2017 |

(Continued)

OTHER PUBLICATIONS

International Search Report and Written Opinion dated Feb. 3, 2020 in counterpart application No. PCT/EP2019/082453; w/English partial translation and partial machine translation (total 21 pages).

(Continued)

*Primary Examiner* — Soo Jin Park
(74) *Attorney, Agent, or Firm* — Seckel IP, PLLC

(57) ABSTRACT

The method for determining at least one morphological data item of a wriststrap wearer in order to prepare (E3) a wristwatch strap taking into account this item includes: acquiring (E1) at least one morphological data item (1; 2) of the wriststrap wearer from an acquisition device of a determination system (11) provided with at least one sensor, such as a camera, a laser or a lens, configured to scan, photograph, or film at least a portion of the wrist and/or hand of the wearer, wherein the determination system (11) is designed to receive and optionally emit waves to acquire at least one morphological characteristic of the wearer of the bracelet in a first operation (O11), the at least one morphological data item being a dimension (1) from among a circumference and/or height and/or width of a wrist portion (p1) and/or of a portion of the hand (p2) of the wearer.

20 Claims, 6 Drawing Sheets

(51) Int. Cl.
*A44C 5/24* (2006.01)
*G04B 37/14* (2006.01)
*G06T 7/62* (2017.01)
*G06V 40/10* (2022.01)

(52) U.S. Cl.
CPC .. *G06V 40/107* (2022.01); *G06T 2207/30196* (2013.01)

(56) References Cited

U.S. PATENT DOCUMENTS

| | | | |
|---|---|---|---|
| 2015/0135410 A1 | 5/2015 | Wu et al. | |
| 2015/0302597 A1* | 10/2015 | Bentson | G06V 40/16 382/154 |
| 2016/0063320 A1* | 3/2016 | Liu | G06Q 30/0613 348/77 |
| 2016/0132023 A1 | 5/2016 | Jung | |
| 2016/0287103 A1 | 10/2016 | Saponas et al. | |
| 2016/0314576 A1* | 10/2016 | Aliverti | G06T 3/40 |
| 2018/0147062 A1* | 5/2018 | Ay | G06T 19/20 |

FOREIGN PATENT DOCUMENTS

| | | |
|---|---|---|
| CN | 106502419 A | 3/2017 |
| CN | 107015659 A | 8/2017 |
| CN | 107705348 A | 2/2018 |
| EP | 0819391 A1 | 1/1998 |
| EP | 3017715 A1 | 5/2016 |
| EP | 3449755 A1 | 3/2019 |
| JP | 2018163031 A | 10/2018 |
| KR | 20110055876 A | 5/2011 |
| WO | 2016161226 A1 | 10/2016 |

OTHER PUBLICATIONS

European Search Report and Written Opinion dated May 17, 2019 in priority U.S. Appl. No. 18/208,366; w/English machine translation (total 19 pages).

Chinese Office Action dated Nov. 30, 2022 in application No. CN 201980077717.7, counterpart of co-pending U.S. Appl. No. 17/295,172; w/English translation (total 35 pages) (note: CN104820498, D1 and US20160063320, D2 cited in the Chinese Office Action are not listed in this IDS since they are listed in the other IDS form filed concurrently and in the IDS filed May 19, 2021, respectively).

Chinese Office Action dated Nov. 24, 2022 in counterpart application No. CN 201980077728.5; w/English translation (total 40 pages) (note: US20160063320, D2 and KR20110055876, D3 cited in the Chinese Office Action are not listed in this IDS since they were listed in the IDS filed May 19, 2021).

Japanese Office Action dated Jul. 11, 2023 in counterpart application No. JP 2021-529367; w/English translation (total 9 pages) (note: US20160063320, D1 and KR20110055876, D2 cited in the Japanese Office Action are not listed in this IDS since they were listed in the IDS filed May 19, 2021).

International Search Report and Written Opinion dated Feb. 3, 2020 in counterpart application No. PCT/EP2019/082454 of co-pending U.S. Appl. No. 17/295,172; w/ English partial translation and partial machine translation (total 21 pages) (US20160063320, WO2016161226 and US20160287103, and US20150135410, D1-D3 cited in the ISR of the co-pending U.S. Appl. No. 17/295,172, are not listed in this IDS form since they are already listed in the IDS form filed.

* cited by examiner

METHOD FOR CONFIGURING A WRISTWATCH STRAP

INTRODUCTION

The present invention relates to a method for determining at least one morphological data item pertaining to a wriststrap wearer and to a method for configuring a wristwatch wriststrap, notably the length thereof. It also relates to a system for determining at least one morphological data item pertaining to a wrist strap wearer and to a system for configuring a wriststrap implementing part of said method.

PRIOR ART

One operation that is important to the comfort of the wearer of a wristwatch is to choose the best possible configuration for the wriststrap, and in particular to achieve the best possible adjustment of the wriststrap length. Naturally, a first phase is usually to add or remove extension linkages or links in order to adjust each strand of the wriststrap to the most suitable length. The result obtained is generally not optimal. For this reason, various wriststraps, particularly those with deployant clasps, are provided with several additional adjusting devices.

Specifically, in a wriststrap fitted with a deployant clasp, the clasp is generally provided with a first adjustment of its positioning relative to the wriststrap, which is the conventional adjustment. In addition, existing deployant clasps are equipped with a solution that allows a second adjustment to be made to the length of the wriststrap, also known as the comfort adjustment, that complements the conventional first adjustment. Document EP0819391 describes, for example, such a solution which relies upon an adjustment linkage arranged within the deployant clasp and which pivots and can occupy two stable positions bringing about two different strap lengths. The short position is maintained by a catch on an end linkage of the wriststrap which catches on and is immobilized elastically against the adjustment linkage in its short position. Such a solution therefore entails the articulation of several linkages and the catching of a linkage in order to ensure the stability of the short position.

Finally, there are solutions for achieving fine adjustment of the length of a wriststrap. In practice, the circumference of the wrist of the individual who is to wear the wriststrap is measured using a graduated tape, then the wriststrap is prepared to this data, before various adjustments are made that may require a number of iterations until the ideal or optimal strap configuration is theoretically achieved. Putting this into practice is often reliant on the experience of an operator and may prove imprecise and time consuming.

Furthermore, it may be necessary to take other data into consideration when configuring a wriststrap, particularly if the strap is equipped with a clasp, particularly a deployant clasp. A deployant clasp is designed to fasten the two strands of a watchstrap around the wrist of its wearer, and may comprise several articulated leaves, which can occupy a closed first position, in which a fastening function is needed to stabilize this closed position, and an open second position in which the watchstrap can be put onto or taken off the wrist. The advantage with such a clasp is that it prevents the wristwatch from dropping as it is removed, because the wriststrap strands remain constantly connected. However, it is necessary for the overall dimension of the wriststrap when the deployant clasp is deployed, in the open position, to be able to fit over the hand. In such a case it is then beneficial also to take the circumference of the hand or "hand clearance", rather than just the wrist clearance, into consideration, as will be detailed hereinafter.

Thus, one general objective of the invention is to offer a solution for configuring a wristwatch wriststrap, particularly for determining the length of a wristwatch wriststrap, that improves on the existing solutions.

More particularly, the invention seeks a solution for adjusting the length of a wristwatch wriststrap that is suited to the morphology of its wearer and, optionally, to the preferences of same.

Furthermore, the invention seeks a reliable and user-friendly solution for configuring a wriststrap.

BRIEF DESCRIPTION OF THE INVENTION

To this end, the invention rests on a method for configuring a wristwatch wriststrap, which comprises at least the following steps:

a first step of acquiring at least one morphological data item pertaining to the wearer of the wriststrap from an acquisition device or determination system set up to receive and possibly emit waves so as to acquire at least one morphological characteristic of the wearer of the wriststrap;

a second step of preparing the wriststrap for the wearer, taking into account the at least one morphological data item acquired during the acquisition first step.

The acquisition first step may comprise acquisition of a dimension, particularly a circumference and/or a height and/or a width of a wearer wrist portion likely to accommodate the wristwatch and/or of a dimension, notably a circumference and/or a height and/or a width, of a wearer hand portion.

The acquisition first step may comprise the acquisition of a dimension of a wearer wrist portion which is likely to accommodate the wristwatch and/or of a wearer hand portion by implementing one of the following substeps:

indication by a man-machine interface representing a digital model obtained by the acquisition first step of at least one wrist and/or hand portion to be considered; or positioning of an indicator on the wrist and/or the hand of the wearer during the acquisition first step to indicate the at least one portion to be considered; or automatic determination by a computer of the at least one wrist and/or hand portion to be considered on a digital model obtained by the acquisition first step from the measurement of at least a distance from a point identified on said digital model, such as the end of the hand or a joint in the wrist.

The acquisition first step may comprise a first operation of acquiring at least one morphological characteristic of the wearer of the wrist, and a second operation of determining the at least one morphological data item from the at least one morphological characteristic acquired during the first operation.

The first operation of acquiring at least one morphological characteristic may comprise the acquisition of at least one morphological characteristic from an acquisition system or determination system provided with at least one sensor, such as a camera, a laser or a lens, configured to scan, photograph or film at least a portion of the wrist and/or of the hand of the wearer.

The at least one morphological characteristic may comprise one or more digital models of a wearer wrist and/or hand portion or data pertaining to the positioning of several points of a wearer wrist and/or hand portion.

The second operation of determining the at least one morphological data item may comprise calculating a dimension from one or more digital models of at least one wearer wrist portion or of the position of several points acquired by the first operation, and possibly calculation by extrapolation for any portions that might not have been acquired during the first operation.

The method for configuring a wristwatch wriststrap may comprise a step of acquiring at least one wearer preference data item including a data item pertaining to the way in which the wearer wishes the wriststrap to encircle his wrist, and/or a data item pertaining to the lifestyle of the wearer, such as, in particular, the weather conditions where the wearer lives and/or pertaining to at least one activity in which the wearer may participate, and/or a data item pertaining to the preference as to type of wriststrap, and the second step of preparing the wriststrap for the wearer may be performed while taking the at least one wearer preference data item into consideration.

The method for configuring a wristwatch wriststrap may comprise an intermediate step of determining at least one optimum configuration of the wriststrap suited to the wearer, from the at least one morphological data item, automatically using a computer program of a configuration system, the second step of preparing the wriststrap for the wearer preferably being performed to an optimal configuration determined in the determination intermediate step.

The method for configuring a wriststrap may comprise an intermediate step of determining at least one optimal configuration of the wriststrap suited to the wearer, from the at least one morphological data item, which comprises identifying in a database of a configuration system wriststrap configuration data best suited to the at least one morphological data item.

The intermediate step of determining the at least one optimal configuration of the wriststrap may comprise at least determining the strap length adjustment.

The intermediate step of determining at least one optimal configuration of the wriststrap may comprise determining configuration data using all or some of the following steps:
  determining the type of wriststrap; and/or
  determining the strand or strands and/or the clasp; and/or
  determining the number of links or linkages, notably the number of extension linkages or links, for at least one strand of the wriststrap; and/or
  determining the configuration or configurations of at least one link or of at least one linkage for at least one wriststrap strand; and/or
  determining the positioning of an end linkage of a wriststrap strand relative to a wriststrap clasp and/or relative to a watch case; and/or
  determining one or more configurations of the wriststrap clasp; and/or
  determining the length adjustment or adjustments within the wriststrap clasp.

The invention also relates to a system for configuring a wristwatch wriststrap, wherein it comprises at least a system for acquiring, or a system, belonging to an equipment item, for determining, at least one morphological data item pertaining to the wearer set up to receive and possibly emit waves so as to acquire at least one morphological characteristic of the wearer of the wriststrap.

The acquisition system or equipment item determination system may comprise at least one sensor, such as a camera, a laser or a lens, configured to scan, photograph or film at least one portion of the wrist and/or of the hand of the wearer and comprises a computer configured to calculate at least one morphological data item from at least one morphological characteristic acquired by the acquisition system or determination system for implementing the wriststrap configuration method as described hereinabove.

The acquisition system or equipment item determination system may comprise a man-machine interface configured to receive the input of at least one wriststrap wearer preference data item.

The invention also relates to an equipment item, wherein said item is a mobile telephone of the smartphone type or a tablet or spectacles comprising a wriststrap configuration system as described hereinabove.

The invention also relates to a method for manufacturing a wristwatch, wherein it comprises a step of selecting a wristwatch and/or a watch case and a step of configuring a wriststrap advantageously on the watch case to a configuration established by a method for configuring a wriststrap as described hereinabove.

The invention also relates to a method for configuring a wristwatch wriststrap for a given wearer, wherein it comprises the following steps:
  a first step of acquiring at least one morphological data item pertaining to the wearer of the wriststrap;
  an intermediate step of automatically determining at least one optimal configuration of the wriststrap suited to the wearer, from the at least one morphological data item;
  a second step of preparing the wriststrap for the wearer, to an optimal configuration determined in the preceding step.

The invention is more specifically defined by the claims.

BRIEF DESCRIPTION OF THE FIGURES

These subject-matters, features and advantages of the invention will be set out in detail in the following description of one particular embodiment given by way of nonlimiting example in connection with the attached figures among which.

To simplify the description, and by convention, the terms "longitudinal direction" will be used for the direction along the length of a wriststrap strand or of a deployant clasp, and "transverse direction" for the perpendicular direction, in the plane of a wriststrap strand, or in other words the direction across the width of a wriststrap strand or of a clasp. The vertical direction is the direction perpendicular to the first two directions, oriented perpendicular to the plane of a wriststrap strand. Furthermore, the term "link" will be used for an individual component of a wriststrap, and the term "linkage" will be used for a collection of links. What is meant by "wriststrap" is either the wriststrap in its entirety, with or without the clasp, or one or other of the strands of the wriststrap. Furthermore, the same references will be used in the various embodiments to refer to elements that are identical or similar or that have the same functions.

Figure 1:
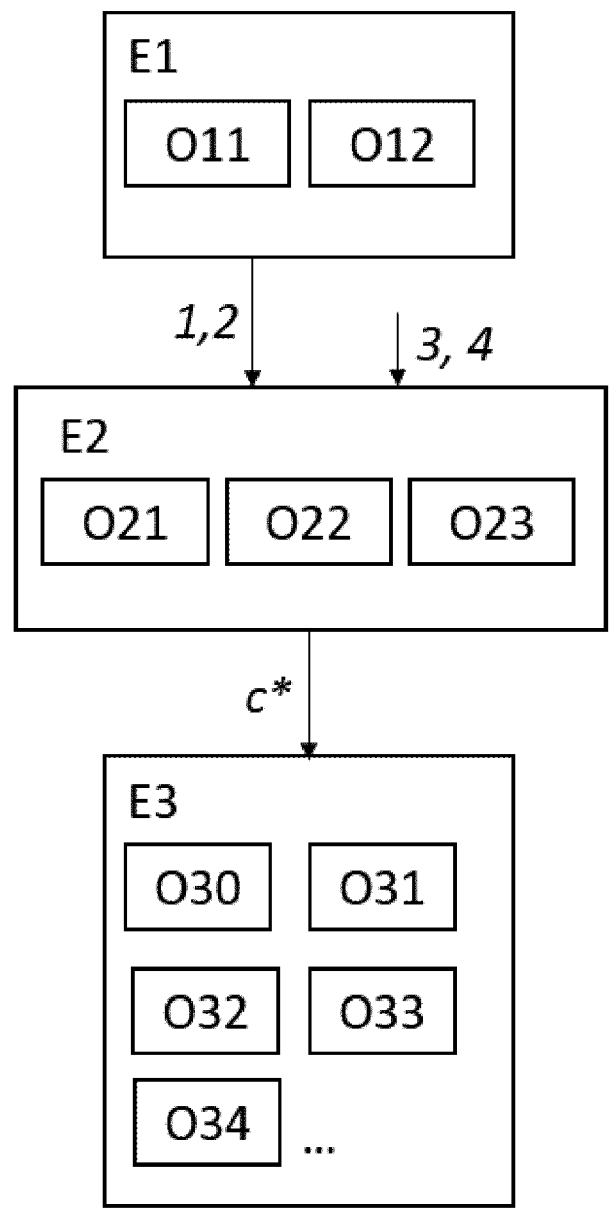
FIG. 1 schematically depicts the steps of a method for configuring a wriststrap according to one embodiment of the invention.

The invention rests on a method for determining at least one morphological data item pertaining to a wriststrap wearer, forming part of a method for configuring a wriststrap, one embodiment of which comprises the steps and operations schematically depicted in FIG. 1.

The method for configuring a wriststrap comprises a first step E1 of acquiring at least one morphological data item pertaining to the wearer of said wristwatch, which forms the method for determining at least one morphological data item pertaining to a wriststrap wearer according to the embodiment of the invention. The method notably comprises a first step E1 of at least partially automatically acquiring at least one morphological data item pertaining to the wearer of said wristwatch.

Figure 2:
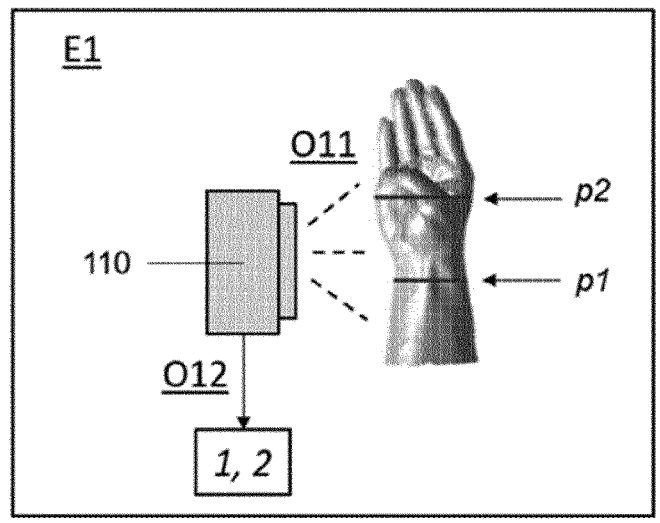
FIG. 2 schematically depicts a method for determining at least one morphological data item for the method for configuring a wriststrap according to the embodiment of the invention.

This morphological data item comprises a first dimension 1 of the wrist and may notably correspond to the circumference of the wrist of the wearer that is intended to accommodate the wristwatch. What is meant by "wrist circumference" is the circumference of a wrist portion p1 that is likely to accommodate the wristwatch, as depicted in FIG. 2. This first dimension may, in a variant or in addition, relate to the height and/or the width of said wrist portion p1. In an advantageous embodiment variant, at least a second morphological data item pertaining to the wearer may be acquired. A second data item may notably correspond to a second dimension 2 corresponding to the wearer hand clearance, useful in the case of a wriststrap with deployant clasp. What is meant here by "hand clearance" is the region of greatest circumference in the region of a hand portion p2, depicted in FIG. 2, that will allow the wriststrap, with the deployant clasp in the deployed open position, to fit over the hand. This second dimension 2 may therefore comprise the circumference and/or the height and/or the width of said hand portion p2. In a variant, other morphological data may be acquired and used.

According to one embodiment, the first step E1 of acquiring at least one morphological data item uses a digital determination system 11 belonging to an equipment item 110 of a wriststrap configuration system which is able to automatically acquire at least one morphological characteristic, in a first operation O11 of the acquisition first step E1. What is meant by a "morphological characteristic" is a digital data item or collection of digital data items from which the at least one morphological data item can be obtained, possibly after processing.

The determination system 11 comprises, for example, a camera, making it possible to obtain a video or one or more images of the morphology of the wearer, in his wrist region, and possibly in the region of their hand according to the advantageous embodiment described. More generally, in an advantageous variant embodiment, the determination system 11 may take the form of an imaging system provided with at least one sensor, for example a lens, which is intended to scan, photograph or film at least a portion p1 of the wrist of the wearer so as to acquire and/or reconstruct at least one image of said portion p1. The imaging system according to the advantageous embodiment may also be configured to scan, photograph or film at least a portion p2 of the hand of the wearer, so as to acquire and/or reconstruct at least one image of said portion p2. More generally still, the determination system 11 is a system set up to receive and possibly emit waves so as to acquire at least one characteristic of a wearer wrist portion p1 and preferably of a hand portion p2 thereof. Thus, according to an alternative variant embodiment of the determination system 11, the latter may, for example, comprise a device equipped with at least a laser, making it possible to acquire a collection of points forming the outline, or a portion of the outline of said wearer wrist portion p1 and preferably said hand portion p2 thereof.

According to the embodiment, the first operation O11 first of all allows the determination system 11 to determine the portion or portions p1, p2 to be considered. To do that, a first variant involves transmitting an indication of at least one wrist portion p1 and/or hand portion p2 to be considered using a man-machine interface representing a digital model of the end of the arm of the wearer, which model is obtained during this acquisition first step. As a variant, an operator positions an indicator on the wrist and/or the hand of the wearer prior to or during the digital acquisition in order to indicate the at least one portion to be considered. The determination system thus obtains a digital model of the end of the arm of the wearer, on which the portion or portions that are to be considered are identified and known. According to yet another variant, the determination system uses a computer to automatically determine the at least one wrist portion p1 and/or hand portion p2 to be considered, on a digital model obtained, for example, by measuring at least a distance from a point identified on said digital model, such as the end of the hand, for example the end of the middle finger, or a joint in the wrist.

At the end of the first operation O11, the method performs a second operation O12 of the acquisition step E1, in which it determines the at least one morphological data item from said morphological characteristic or characteristics obtained during the first operation O11. In particular, according to the embodiment described, this second operation O12 allows the circumference and/or a height and/or a width of a wrist portion p1 and the circumference and/or a height and/or a width of a hand portion p2 to be determined with precision. To do that, the characteristic or characteristics derived from the first operation O11 are processed, preferably using a software means belonging to the determination system or any other computer of the configuration system, for example in a central processing unit, in order therefrom to deduce the dimensions 1, 2 that form the morphological data items sought. To simply the description, these dimensions 1, 2 will be likened to the morphological data items 1, 2 hereinafter.

According to the embodiment of the invention, the morphological characteristics may be a two-dimensional or three-dimensional image of the wearer wrist portion p1 and of the hand portion p2 thereof. More generally, these morphological characteristics form a digital model of a portion of the wrist or of the hand of the wearer or digital data regarding the positioning, advantageously the three-dimensional positioning, of several points of a portion of the wrist or a portion of the hand. From these characteristics, the software means is able to calculate the morphological data items sought. This calculation employs, for example, image processing: if the characteristics comprise enough images to visualize the entire outline to be measured in order to obtain a circumference, the calculation consists in summing the length of the various parts of this outline which are obtained separately, in order to reconstruct the morphological data item sought. If these images are not sufficient to feature the entirety of the outline, the missing portion is calculated by extrapolation. To do that, geometric calculations are employed. In a variant, the image or images are sufficient to obtain a height and/or a width of the wrist portion p1 and/or of the hand portion p2. In addition, these results can also employ parameters obtained by learning. The same principle is applied if the characteristics are points on the outline that is to be measured. At the end of the second operation O12, the configuration method has thus been able automatically and reliably to formulate, automatically and quickly, the morphological data needed for correctly configuring the wriststrap.

Naturally, the morphological data mentioned in this embodiment are quoted by way of advantageous examples. It is possible to conceive of another embodiment using just one of these data items, or at least one other morphological data item, which may or may not be combined with a or the morphological data item(s) of the embodiment described.

Furthermore, in addition to the morphological data, other preference data useful to configuring the wriststrap may be transmitted to the wriststrap configuration system. These data may notably comprise wearer preferences, notably relating to the wearing of the wriststrap. These watch wearer preference data comprise, for example, first preference data 3 relating to the type or types of strap(s) desired, for example a metal wriststrap or a flexible wriststrap, a wriststrap with or without deployant clasp, notably within the limits offered by the catalog of wristwatches offered by the manufacturer.

These preference data may also comprise one or more second preference data items 4 regarding the way in which the wearer wishes the wriststrap to encircle his wrist, namely defining how much or little slack (play) there should be between the wrist and the wriststrap, and possibly relating to the wearer lifestyle, such as, in particular, the weather conditions where the wearer lives and/or at least one activity in which the wearer may participate, such as sports in which the wearer may participate and which are likely to cause the dimension 1 of the wrist to vary. A second preference data item 4 may notably comprise a dimension 1', derived from the dimension 1 relating to the wrist, that allows said dimension 1 associated with the wrist portion p1 to be adapted to suit a particular situation different than the situation of the operation O11, for example after some activity such as participation in sport. This dimension 1' may, for example, be obtained through a predictive analysis on the basis of the morphological data 1, 2 and possibly the second preference data 4. In a variant, this derived dimension 1' may be obtained by consulting a preestablished database, particularly based on a survey conducted separately by the manufacturer.

Figure 4:
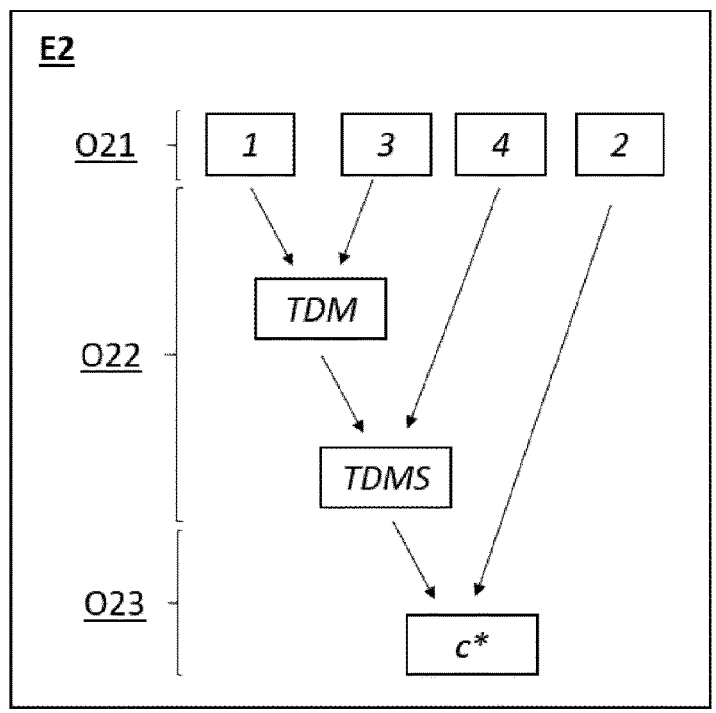
FIG. 4 depicts the step of determining at least one optimal configuration for the wriststrap in the wriststrap configuration method according to the embodiment of the invention.

The wriststrap configuration method according to the embodiment of the invention then advantageously, but optionally, performs an intermediate step E2 of determining at least one optimal configuration of the wriststrap suited to the wearer, one embodiment of which will now be described with reference to FIG. 4. This step is advantageously performed either completely or partially automatically, as will be described hereinafter. In a variant, this step could be manual.

In a first operation O21 of this determination intermediate step E2, the morphological data item or items 1, 2 from the first step E1, particularly the dimensions of the wrist and of the hand, are transmitted to a calculation unit of the wriststrap configuration system to be processed by a computer program of a computer designed to supply an optimal strap configuration c*. In a manual variant, the salesperson could simply look up the optimal configuration on a preestablished chart.

According to the embodiment, the wearer preference data 3, 4 are likewise transmitted to the calculation unit of the wriststrap configuration system to be taken into consideration.

Figure 3:
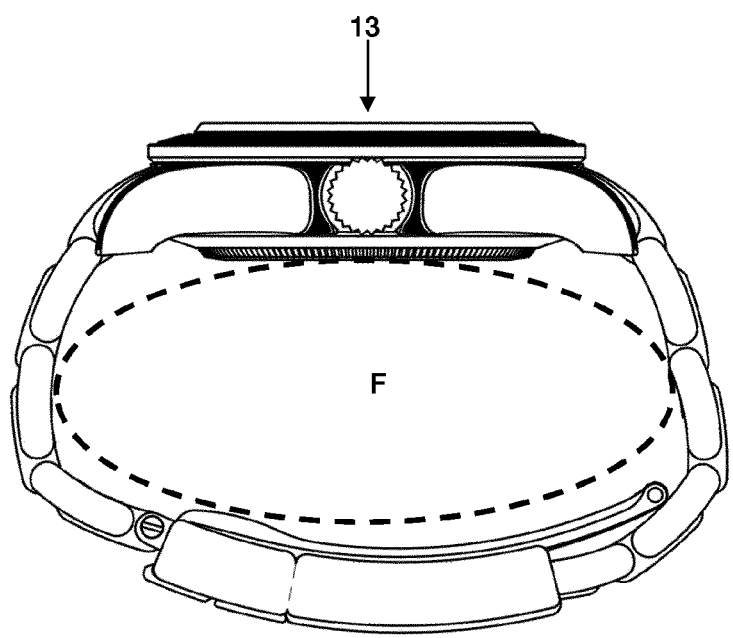
FIG. 3 depicts a first operation of a determination step of the wriststrap configuration method according to the embodiment of the invention.

The second operation O22 of the determination intermediate step E2 involves determining a watch circumference (TDM) corresponding to an overall shape of a wriststrap in the closed position and attached to the watch case, and which is fitted around a particular shape F featuring a wearer wrist portion p1, as depicted in FIG. 3. The watch circumference (TDM) corresponds, or corresponds as well as possible, to the circumference of the wrist portion p1 and/or to the height and/or to the width of the wrist portion p1 of the wearer.

Thus, the particular shape F is advantageously set up to correspond as well as possible to the wrist portion p1 likely to accommodate the wristwatch 13, and which is known from the morphological data item or items 1. The particular shape F may, for example, be elliptical; the coefficients defining the ellipse being adapted to correspond as well as possible to the height and/or to the width of the wrist if these data form part of the morphological data known. In a variant, another ovoid shape could be chosen, for example one closer to a rectangle.

The watch circumference obtained by the above considerations may optionally be adapted using a weighting coefficient to allow the wristwatch to fit the wrist portion p1 with an optimal amount of slack for the comfort of the wearer. This weighting coefficient thus corresponds to the amount of slack considered to be optimal. It may be a predefined constant, or may be adjusted to take account of the specific shape of the wearer wrist portion p1. For example, if there is a greater difference between the particular shape F and the shape of the wrist portion p1, the weighting coefficient may be increased. These calculations may be performed automatically by a computer of a central processing unit of the configuration system, from digital data stored in an associated electronic memory.

Next, according to the embodiment of the invention, the watch circumference obtained above from the morphological data alone is adapted once again to take account of the wearer preference data. The watch circumference obtained above may thus give rise to the determining of a desired watch circumference (TDMS).

In particular, the preference data may comprise information as to whether the wristwatch is to be worn as a tight or as a loose fit. Depending on this wearer information, the watch circumference is modified by applying a second weighting coefficient, allowing the amount of slack around the wrist to be increased or reduced. In addition to this, preference data may relate to the place at which the wearer lives or the activities participated in, this being taken into consideration by applying another weighting coefficient or by a parameter in the configuration of the wristwatch that allows for the possibility of adjustment to suit a certain activity that is being performed. In the latter instance, the wristwatch will be able to be adapted by adjusting a first optimal configuration of the wriststrap to a different second configuration that is optimal for a specific activity.

In a third operation O23 of the determination intermediate step E2, the actual configuration of the wriststrap is finally determined, on the basis of the watch circumference (TDM) or desired watch circumference (TDMS) established previously. This operation O23 seeks one or more wriststrap configurations that correspond to or best satisfy the watch circumference considered. For that, this operation O23 involves iterating through a wriststrap database, notably a wriststrap configuration data database containing data on all or a large proportion of the existing configurations of a wriststrap of a given wristwatch according to the first preference data 3, so as to detect an optimal configuration c* for said wriststrap that is best suited to the watch circumference considered. This optimal configuration is notably chosen from among the configurations that allow the watch case and/or clasp to be best centered or equalized on the wearer wrist portion p1. Furthermore, the program additionally verifies that, in the event of a deployant clasp being present, the wriststrap configuration adopted is compatible with the hand portion p2 when the deployant clasp is in the open position. The method thus automatically defines the optimal tradeoff between a wristwatch adequately and comfortably hugging the wrist of its wearer and the ability to offer enough of an opening to fit over the hand of the wearer, whatever the dimensions of the hand and of the wrist of the wearer.

Note that this operation O23 may be repeated according to the first preference data 3, and particularly different types of desired wriststrap, if there are several of these. Thus, for each type of wriststrap compatible with the watch case chosen by the wearer, the program may test the various possibilities offered by each of the wriststraps in order to establish an optimal configuration for each of the wriststraps. Thus, at the end of iteration, the program may optionally deliver an indication as to an optimal configuration best suited to the morphological data item or items 1, 2 and possibly the preference data item or items 3, 4, from among the various optimal configurations of different wriststraps.

In other words, at the end of iteration, the program adopts an optimal configuration for a wriststrap that offers the wearer optimal comfort. The program may also adopt the wriststrap or straps the configuration of which is best suited to offering the wearer optimal comfort.

For each type of wriststrap considered, the program proceeds by iteration according to the various possibilities populating the wriststrap database, in order to test the various possible configurations for each wriststrap and converge toward an optimal configuration. Among these configuration options for a given type of wriststrap, mention may be made of the following:

- determining the clasp, assuming that there are a number of clasps compatible with the given type of wriststrap; and/or
- determining the number of links or linkages, notably the number of extension linkages or links, for each strand of the wriststrap, in the event that the type of wriststrap is made up of links or of linkages; and/or
- determining the configuration or configurations of at least one link or of at least one linkage for at least one wriststrap strand, in the event that this at least one link or this at least one linkage is liable to have a number of configurations; and/or
- determining the positioning of an end linkage of a wriststrap strand relative to a clasp of the wriststrap and/or relative to the watch case chosen, particularly so as to obtain a length adjustment; and/or
- determining one or more wriststrap clasp configurations, in situations in which a clasp considered allows a number of configurations; and/or
- determining the length adjustment or adjustments within the wriststrap clasp and/or at the interface to the watch case.

Finally, if several types of wriststrap have a configuration that is substantially equivalent and conforms to the characteristics of the wearer, these may be proposed to the wearer who will then make the final choice on wriststrap type.

In a variant embodiment of this determination intermediate step E2, the calculation unit of the wriststrap configuration system comprises a wriststrap database which contains a correlation between the morphological data, and possibly the preference data, and a configuration of a type of wriststrap. Thus, from the knowledge of the data derived from the acquisition first step, the second operation O22 can look up directly in the database the suitable wriststrap configuration or configurations for each type of wriststrap. In this variant, the program in the computer selects, for a given model of watch case chosen by the wearer, the optimal watch-strap configuration or configurations c* best suited to the morphology of the wearer and possibly to the wearer's preferences.

At the end of the determination intermediate step E2, the optimal watch-strap configuration or configurations c* best suited to the morphology of the wearer and possibly to the preferences of the wearer is (or are) communicated to the watchmaker, to the retailer, or to the manufacturer, etc., and/or to the wearer via a man-machine interface of the wriststrap configuration system. This transmitted information may contain all the details regarding the adjustments and options for the type of wriststrap adopted, including:

- the strand or strands selected; and/or
- the clasp selected; and/or
- the linkages or links to be added and/or removed to or from one or other of the strands; and/or
- the linkage(s) or link(s) to be configured to a predefined configuration; and/or
- the strand, notably the linkage(s) or link(s) to be moved with respect to the clasp and/or with respect to the watch case; and/or
- the length adjustment of a length adjustment linkage within a clasp and/or at the interface to a watch case.

Note that the determination intermediate step E2 might determine several optimal configurations, either for different types of wriststrap which might have an equivalent optimal configuration, or for the one same wriststrap, but according to different particular use scenarios.

Next, the method for configuring a wriststrap comprises a second step E3 of preparing the wriststrap for the wearer, to an optimal configuration determined in the previous step. To do that, the watchmaker, or any individual qualified to carry out the preparation second step E3, performs the final fitting and/or final adjustment of each wriststrap strand, on the basis of the precise information determined and transmitted at the end of the previous step. As a result of this final step, the wriststrap configuration method according to the invention can also be considered to be the last step in a method for manufacturing the wriststrap, or in a method for fitting or adjusting a wriststrap.

Figure 5:
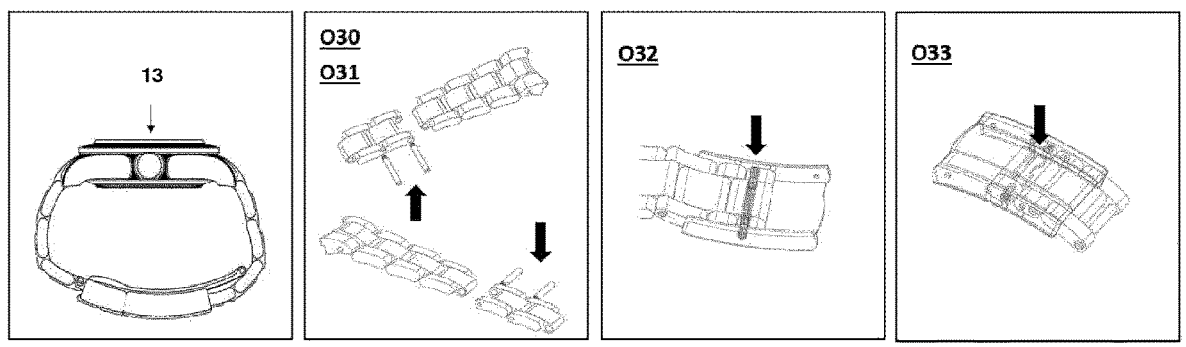
FIG. 5 depicts an assistance interface for a step of preparing a wriststrap in the wriststrap configuration method according to the embodiment of the invention.

According to one advantageous embodiment, the wriststrap configuration system has a man-machine interface, as depicted in FIG. 5, via which it transmits one or more images to assist with the final configuration of the wriststrap.

According to one embodiment, the wriststrap chosen may be transported and stored in a predefined configuration, in which case this second step E3 consists in modifying the wriststrap from the predefined configuration into an optimal configuration established in the determination intermediate step E2.

In this second step, a watchmaker, or any individual qualified to perform the second step may, in a first operation O30, select at least one strand 6 of wriststrap, from among n strands of different lengths. They may then act on at least one wriststrap length-setting device 5. This may, for example, be means 51 that allow an extension linkage or link to be fitted to or removed from a wriststrap strand, or else means 52, 53 that allow a link or a linkage of a strand to be configured in a given configuration, or that allow the configuring of the position of a strand with respect to a clasp or to a watch case, so as to achieve the best adjustment of the length of said strand and, more generally, of the wriststrap.

Figure 6:
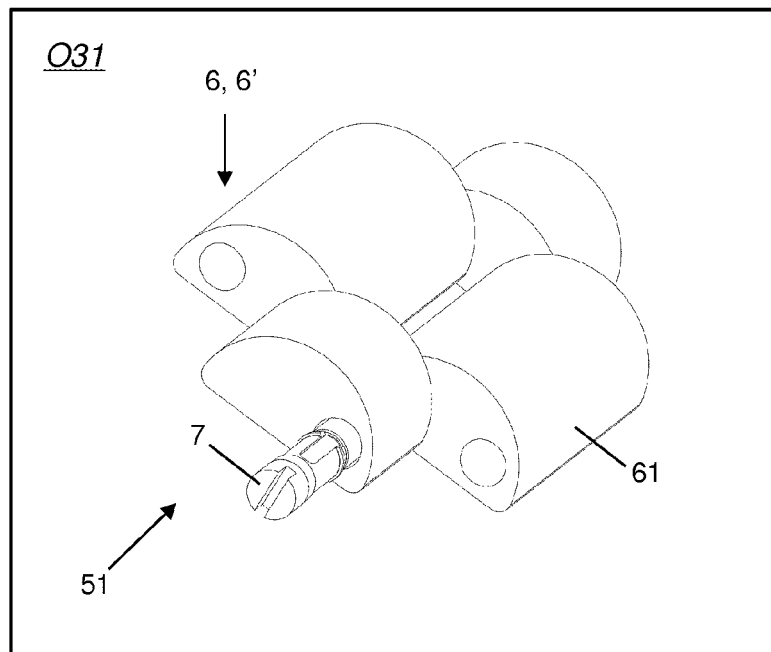
FIG. 6 depicts a perspective view of the linkages of a wriststrap strand during the adjustment thereof according to one step in the wriststrap configuration method according to the embodiment of the invention.

In the special case of a wriststrap of the metallic or partially metallic type equipped with linkages, the watchmaker may, in a second operation O31 depicted in FIG. 6, add or remove links or linkages 61 to or from a first strand 6 of wriststrap and/or to or from a second strand 6' of wriststrap, for example using means allowing easy removal/refitting, such as screws 7, notably elastic screws. As a preference, this second operation O31 is performed exclusively by the watchmaker.

Figure 7:
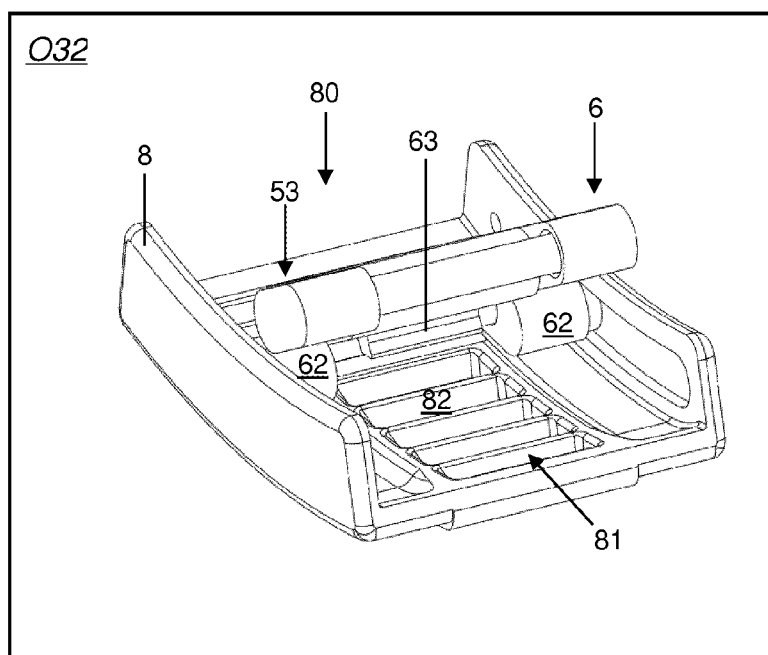
FIG. 7 depicts a perspective view from beneath of a clasp as it is being adjusted according to a step of the wriststrap configuration method according to the embodiment of the invention.

In a third operation O32, depicted in FIG. 7, the watchmaker may position the end of one strand 6 of wriststrap in a predefined position with respect to a cover 8 of a deployant clasp 80 using a device 53 which, for example, allows a linkage 62 to be held in place via a system of notches 81. Such a system of notches may, for example, comprise a cover 8 equipped with a system of indexing teeth 82 designed to collaborate with a lug 63 of the strand 6. Such a device may be manipulated by the watchmaker or just as well by the wearer of the wristwatch. Alternatively or in addition, one link or linkage may be indexed relative to the cover of the clasp via a bar that can be positioned in a number of predefined positions of the cover (which device is not depicted).

Figure 8:
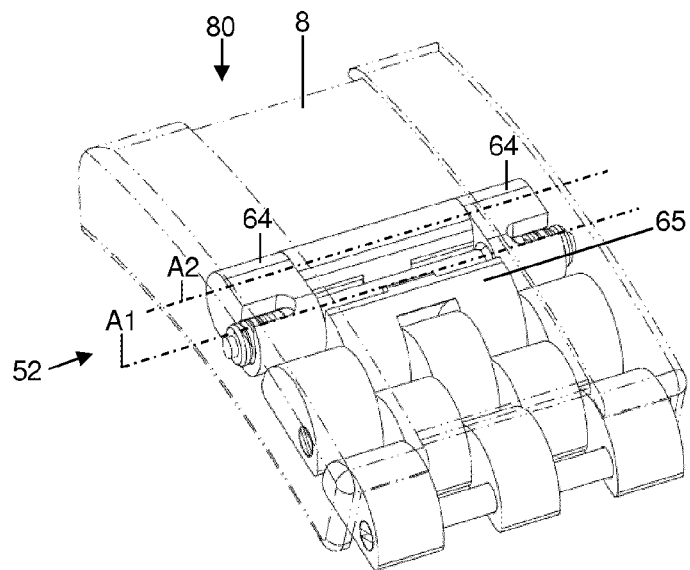
FIGS. 8 and 9 depict views of a clasp as it is being adjusted in a step of the wriststrap configuration method according to the embodiment of the invention.
Figure 9:
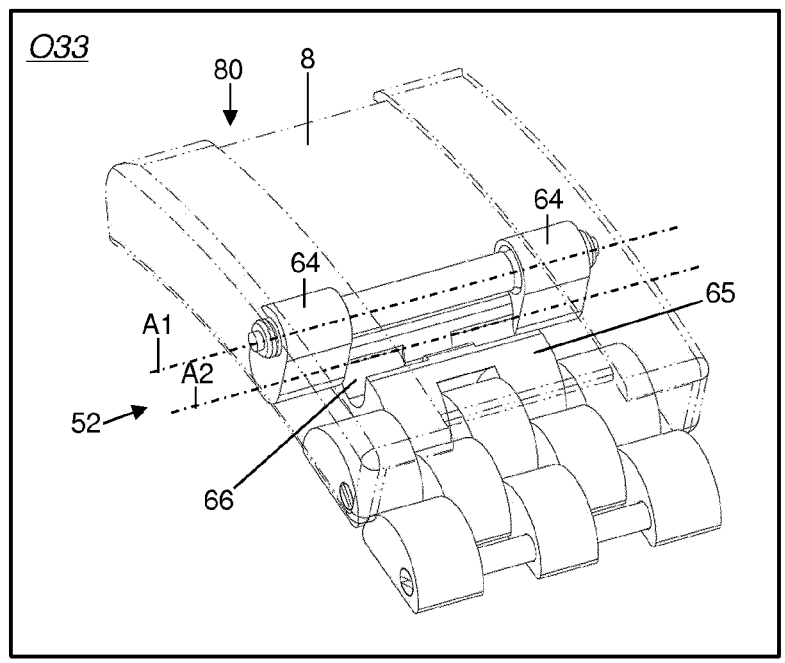

In a fourth operation O33, depicted in FIG. 9, the watchmaker may configure an extension linkage or link into a first or a second configuration so as to lengthen or shorten a first and/or a second wriststrap strand. For example, an adjusting linkage 64 is provided with two axes of articulation A1, A2 connected respectively with the cover 8 of the deployant clasp 80 and with an end link 65 of one strand 6 of the wriststrap. The connecting linkage 64 is able to pivot with respect to its first axis A1, connected with the cover 8 of the deployant clasp 80, to cause its second axis A2, connected with the end link 65, to move to one side or the other of the first axis A1 in order to define two determined lengths of wriststrap. The end link 65, connected to the adjusting linkage 64, comprises a notch 66 which, when the adjusting linkage 64 is in a position corresponding to the short configuration of wriststrap, can be elastically immobilized against the adjusting linkage 64. FIG. 8 illustrates the device with the wriststrap in the short configuration while FIG. 9 illustrates the device in the process of being actuated.

Figure 10:
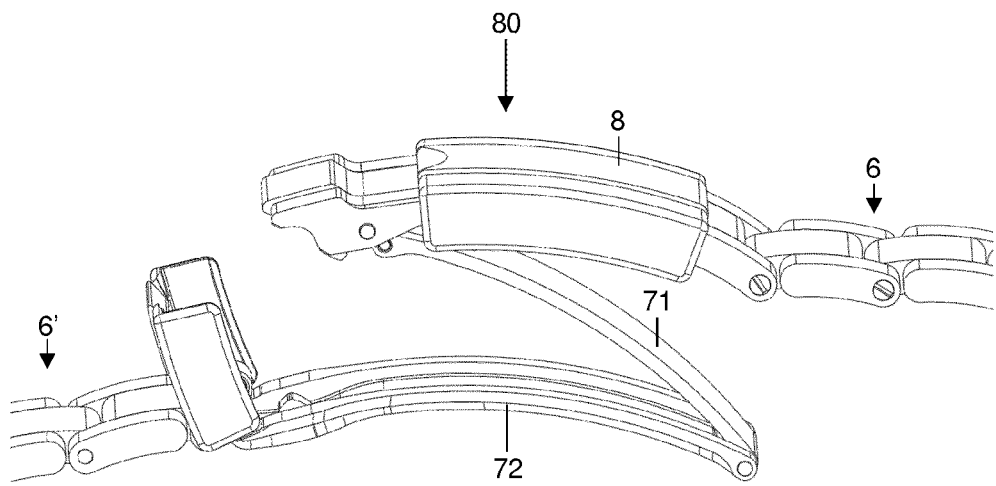
FIG. 10 depicts a perspective view of a deployant clasp of a wriststrap configured by the wriststrap configuration method according to the embodiment of the invention.

A fifth operation O34 of selecting a deployant clasp 80 from n clasps of different sizes may also be performed. For example, in the case of a deployant clasp equipped with leaves 71, 72 as illustrated in FIG. 10, different sizes of leaves may be provided so as to best fit the morphology of the wearer of the watch. Such a deployant clasp may comprise two leaves. Alternatively, it may comprise more than two leaves, for example three leaves, with a view to obtaining maximized deployment to allow the wristwatch to be put on or taken off regardless of the size of the wearer's hand, notably of the wearer hand portion p2. In addition or alternatively, such a clasp may comprise at least one leaf of which at least part is able to have two predefined configurations when said clasp is manipulated, so as to make it easier to fit over the hand of the wearer, notably the wearer hand portion p2.

Such an operation may possibly precede one or other of the operations O31, O32, O33.

Of course, all of these operations are optional and do not necessarily have a hierarchical order. Thus, the watchmaker, in order to switch from a predefined configuration of a wristwatch to an optimal configuration c* of the wriststrap may, for example, perform all or some of the operations O30, O31, O32, O33, O34 described hereinabove.

The method is not restricted to a type of wriststrap having metal linkages. In the case of a flexible wriststrap, of which the strands are, for example, at least partially made of leather, elastomer or textile, the first operation O30 of selecting at least one strand from n strands of different lengths may advantageously be performed before any other operation. All or some of the operations O31, O32, O33, O34 may also be performed, but not necessarily. In particular, one end of a flexible strand may be positioned in a predefined position with respect to a clasp, particularly a cover of a deployant clasp. These flexible strands may be reduced to a single strand. Alternatively, they may be connected to a deployant clasp via one or more metal links. The clasp of a "flexible wriststrap" may potentially comprise leaves and/or a cover. Alternatively, the clasp may be reduced to a buckle, particularly a buckle-barb (or more generally, to any non-deployant clasp). In the latter instance, the preparation second step E3 may be reduced to causing the barb to collaborate with a means such as a hole formed on a strand identified beforehand during the determination intermediate step E2 and selected during the first operation O30.

The invention also relates to a wriststrap configuration system employing the configuration method described hereinabove. This wriststrap configuration system comprises at least one system 11 for determining at least one morphological data item pertaining to a wearer of a wriststrap and possibly a computer of a calculation unit which implements the determination intermediate step E2 as described hereinabove in order to determine the optimal configuration for the wriststrap according to the at least one morphological data item acquired by the determination system 11.

The determination system 11 is configured to receive and possibly to emit waves so as to acquire at least one morphological characteristic of the wearer of the wriststrap. The determination system 11 is configured to implement the method for determining at least one morphological data item pertaining to a wearer of the wriststrap. Advantageously, the determination system 11 comprises an acquisition device, such as at least one sensor, such as a camera, a laser or a lens, configured to scan, photograph or film at least a portion of the wrist and/or of the hand of the wearer. For example, this may be an infrared camera capable of acquiring and/or mapping points on the forearm of the wearer by projection, thus making it possible to create a model of the forearm of the wearer. The determination system 11 may additionally comprise a computer configured to calculate at least one morphological data item from at least one morphological characteristic acquired by the acquisition device, using the method described hereinabove. Finally, the determination system 11 may comprise a man-machine interface configured to receive the input of at least one data item, preferably pertaining to the wearer of the wriststrap. This man-machine interface may also in a variant display a digital model of the forearm of the wearer, and possibly allow said wearer to interact, for example to participate in the detection of the wrist portion p1 and hand portion p2 or simply display the portions identified automatically. This determination system may be linked to a central processing unit by a communication device.

The invention also relates to a determination system as such, for example taking the form of a portable object, wherein it comprises a computer configured to implement at least the acquisition first step E1 of the method described hereinabove. It also relates to a computer program containing instructions which, when the program is executed, cause the program to implement the method for determining at least one morphological data item pertaining to a wearer of a wriststrap, and therefore at least said acquisition first step E1 of the method for configuring a wriststrap.

As a preference, the determination system and the central processing unit are positioned nearby, or within the same equipment item. They may share a single and common computer. Thus, the configuration system, or at least the determination system, forms an item of equipment 110 which advantageously takes the form of a compact item of equipment that is readily transportable and/or that can easily be installed at retail stores. As a preference, this item of equipment 110 takes the form of a mobile telephone or of a smartphone, a tablet, or a pair of spectacles that can be operated by the watchmaker or the retailer and thus accompanies the wearer of the wristwatch through a particularly recreational and not overly time-consuming purchasing experience. As an alternative, it is a piece of equipment belonging to the wearer, allowing distance purchasing, away from the retail stores, for example from home.

Figure 11:
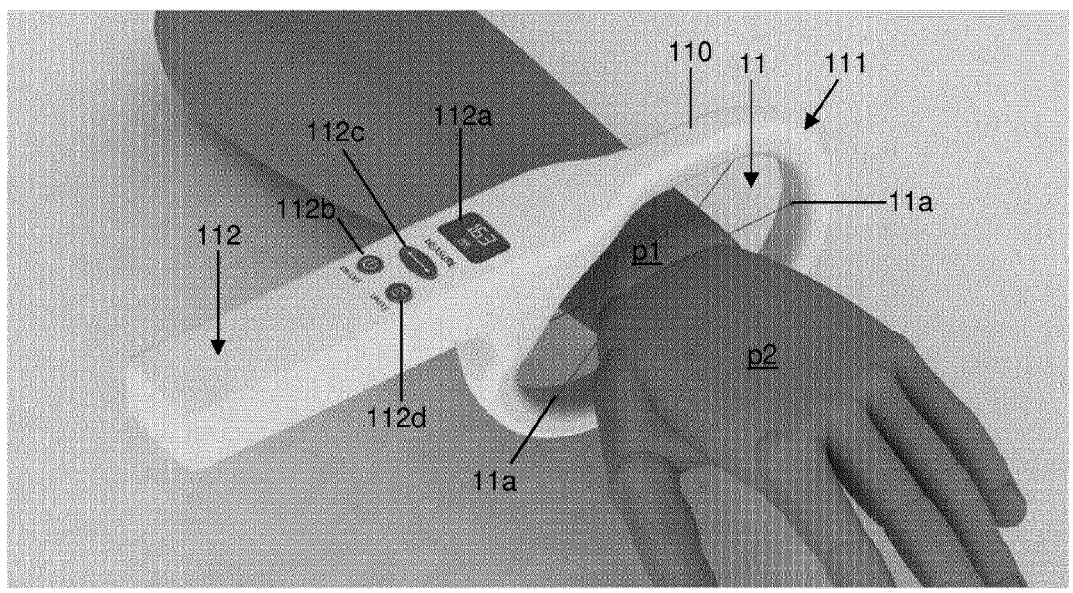
FIG. 11 depicts an item of equipment comprising a system for determining at least one morphological data item pertaining to a wriststrap wearer according to one embodiment of the invention.

In a variant, the equipment 110 comprising the system 11 for determining at least one morphological data item pertaining to a wearer of a wriststrap takes the form of a portable equipment item, depicted in FIG. 11, comprising at least a first portion 111 of annular or substantially annular or elliptical or substantially elliptical shape. This first portion 111 more specifically comprises an acquisition device which comprises several emitters/receivers 11a, for example of a laser beam. This first portion 111 of equipment 110 is intended to encompass a portion p1 of the wrist and/or a portion p2 of the hand, so as to automatically acquire at least one morphological characteristic of at least one of these two portions. As a preference, the equipment 110 comprises a second portion 112 in the form of a handle. Advantageously, this second portion 112 of the equipment 110 can be handled by a watchmaker or by any qualified person so that the first portion 111 of the equipment 110 can encompass a portion p1 of the wrist and/or a portion p2 of the hand of the wearer, and thus proceed to carry out the method for determining at least one morphological data item pertaining to a wearer of a wriststrap, and notably the acquisition step E1 described hereinabove.

Advantageously, the second portion 112 of the equipment 110 comprises a screen 112a designed to display at least a dimension 1, notably a circumference and/or a height and/or a width of a wearer wrist portion p1 and/or a dimension 2, notably a circumference and/or a height and/or a width of a wearer hand portion p2.

The equipment 110 advantageously allows implementation of an acquisition first step E1 as described above, including the various following suboperations of the first operation O11 described hereinabove, as follows:
- a first operation O111 consists in applying power to the equipment 110, for example by pressing a key 112b on the portion 112;
- a second operation O112 consists in slipping the first portion 111 of the equipment 110 around the wrist or the hand of the wearer and in positioning the first portion 111 relative to a portion p1 or p2. To do this, according to the embodiment, colored lines reflecting off the wrist or the hand of the wearer, can be used to show one or other of the portions p1, p2;
- a third operation O113 consists in validating the location of one or other of the portions, for example by pressing a key 112c on the equipment 110, notably a key 112c on the second portion 112 of the equipment 110;
- a fourth operation O114 consists in validating the centering of the equipment 110 around the first portion p1 or the second portion p2. To do that, a visual and/or audible acknowledgement may be emitted by the equipment 110.

The acquisition first step E1 then comprises the implementation by the same equipment 110 of the second operation O12 described above, in which operation the equipment determines the at least one morphological data item from said morphological characteristic or characteristics obtained during the first operation O11. In particular, this second operation O12 is able to determine with precision the circumference and/or a height and/or a width of a wrist portion p1 and/or the circumference and/or a height and/or a width of a hand portion p2. To do that, the characteristic or characteristics from the first operation O11 are processed, preferably by a software means of the determination system, in order therefrom to determine the dimensions 1, 2 that form the morphological data sought. This second operation O12 notably comprises a suboperation O121 of displaying and reading one or other of the dimensions 1, 2 on the screen 112a of the second portion 112 of the equipment 110. An intermediate operation of selecting the units of measurement may also be proposed, for example by pressing a key 112d on the equipment.

As an alternative to this mobile equipment 110 depicted in FIG. 11, a similar piece of equipment may take the form of a non-portable object, for example an object placed on a table. It may for example comprise a portion 111 having an annular or substantially annular or elliptical or substantially elliptical shape similar to that depicted in FIG. 11, connected to a stand designed to rest on a table. The various components and operation of such an item of equipment would be very similar to the foregoing description.

As mentioned previously, the central processing unit that advantageously implements the determination intermediate step E2 is advantageously integrated into the same first equipment 110 used in the acquisition first step E1. Alternatively, it may be a separate entity, such as a desktop computer for example. In that case, the determination system is connected to this computer by a communications device for transmitting, preferably automatically, the data acquired and/or processed locally in the determination system. In the latter case, the first equipment 110 used in the first step E1 may notably be equipment belonging to the wearer, such as a tablet or a smartphone. The central processing unit that implements the second step E2 may be present locally at a retail stores, or may be a remote unit, housed by the manufacturer for example, connected by communications devices to at least one determination system.

Finally, the wriststrap configuration system comprises one or more electronic memories, notably to house the databases mentioned in the description of the method. This or these electronic memories are therefore connected to the central processing unit by one or more communications devices. Such a memory may be integrated into a compact piece of equipment forming the configuration system or, as an alternative, be remote and connected to the central processing unit or to the determination system by a communications device.

The method according to the invention has been described in a scenario allowing a wriststrap to be configured in a sale of a particular model of wristwatch. Of course, this method can be implemented to inform a wearer of a wristwatch of an optimal configuration c* for its wriststrap, even after purchasing or independently of the purchase of said wristwatch.

Alternatively, the invention also relates to a method for configuring a wristwatch wriststrap for a given wearer, wherein it comprises the following steps:
  a first step of acquiring at least one morphological data item 1; 2 pertaining to the wearer of the wriststrap;
  an intermediate step of automatically determining at least one optimal configuration c* for the wriststrap suited to the wearer, from the at least one morphological data item 1; 2 acquired in the previous step;
  a second step of preparing the wriststrap for the wearer, to an optimal configuration determined in the previous step.

In this alternative, the determination intermediate step corresponds to the determination intermediate step described previously, implemented automatically.

According to a variant of this alternative, the acquisition first step E1 of the method can be simplified. For example, it may be implemented using a conventional system of the tape measure type. Such a tape may or may not be returned by an elastic device. As an alternative, the wearer may already know the morphological data from prior measurement and simply input these data into the determination system via a man-machine interface.

According to one particular embodiment of this alternative, the operation O23 of the intermediate step may be performed differently. For example, an electronic memory may contain digital data corresponding to configuration rules associated with each strand of wriststrap and/or with each subcomponent of a wriststrap, such as a link, a linkage and a clasp. Next, an algorithm is able, by iteration, to form all the possible combinations of configurations for a given wriststrap, from the rules stored in memory, until it converges upon an optimal configuration. In a variant, this approach is able to automatically form the database of abovementioned wriststrap data, in which database the possible configurations are stored.

According to another particular embodiment of this alternative, the determination intermediate step may take account of an optimal configuration of one (or more) wristwatch(es) already worn by the wearer. In that case, this known optimal configuration may be input by the wearer, the retailer, or the watchmaker, via a man-machine interface of the wriststrap configuration system. This information may potentially be exploited in order to obtain the watch circumference to be taken into consideration in the step O22 explained hereinabove. This information may thus act as sources for the acquisition of morphological data pertaining to the wearer, or equivalent, according to an embodiment described hereinabove with reference to the acquisition first step E1.

The intermediate step of determining the at least one optimal configuration for the wriststrap may involve at least determining the wriststrap length adjustment.

The intermediate step of determining at least one optimal configuration for the wriststrap may involve identifying, in a database, wriststrap configuration data best suited to the at least one morphological data item.

The intermediate step of determining at least one optimal configuration for the wriststrap may involve determining configuration data using all or some of the following steps:
  determining the type of wriststrap; and/or
  determining the strand or strands and/or the clasp; and/or
  determining the number of links or linkages, notably the number of extension linkages or links, for at least one strand of the wriststrap; and/or
  determining the configuration or configurations of at least one link or of at least one linkage for at least one wriststrap strand; and/or
  determining the positioning of an end linkage of a wriststrap strand relative to a wriststrap clasp and/or relative to a watch case; and/or
  determining one or more configurations of the wriststrap clasp; and/or
  determining the length adjustment or adjustments within the wriststrap clasp.

The intermediate step of determining at least one optimal configuration for the wriststrap may comprise a step of displaying a determined optimal configuration on a screen of a configuration system.

The intermediate step of determining at least one optimal configuration for the wriststrap may involve taking into consideration at least one wearer preference data item that includes data regarding the way in which the wearer wishes the wriststrap to encircle his wrist, and/or data regarding the lifestyle of the wearer, such as, in particular, the weather conditions where the wearer lives and/or at least one activity in which the wearer may participate, and/or data regarding a preference as to type of wriststrap.

The intermediate step of determining at least one optimal configuration for the wriststrap may involve calculating the amount of slack around the wrist of the wearer according to the at least one preference data item and/or calculating a variation in a morphological data item pertaining to the wearer over the course of time, from the at least one preference data item.

The first step of acquiring at least one morphological data item may involve acquiring a dimension, notably a circumference and/or a height and/or a width of a wearer wrist portion likely to accommodate the wristwatch and/or a dimension, notably a circumference and/or a height and/or a width, of a wearer hand portion.

The acquisition first step may comprise a first operation of acquiring at least one morphological characteristic of the wrist of the wearer and a second operation of determining the at least one morphological data item from the at least one morphological characteristic acquired during the first operation.

The first operation of acquiring at least one morphological characteristic may comprise a step of acquisition from a determination system provided with at least one sensor, such as a camera, a laser or a lens, configured to scan, photograph or film at least one wearer wrist and/or hand portion.

The acquisition first step may include the capture of the at least one morphological data item via a man-machine interface or the transmission of the at least one morphological data item or of a derived data item such as a wrist circumference from an electronic memory, particularly a database.

The second step of preparing the wriststrap may involve modifying the wriststrap, notably from a standard configuration, to achieve an optimal wriststrap configuration c* as determined by the determination intermediate step.

In this alternative, the invention also relates to a wriststrap configuration system, wherein it comprises at least one system for determining at least one morphological data item and a computer which implements at least the intermediate step of determining at least one optimal wriststrap configuration c* described hereinabove, to determine an optimal configuration for the wriststrap on the basis of the at least one morphological data item acquired by the determination system 11.

In this alternative, the invention also relates to a method for manufacturing a wristwatch, wherein it comprises a step of selecting a wristwatch or a watch case and a step of configuring a wriststrap on the watch case to a configuration established by a wriststrap configuration method as described hereinabove.

In this alternative, the invention also relates to a data processing device, wherein it comprises a computer configured to implement at least the intermediate step of determining at least one optimal configuration c* for the wriststrap described hereinabove, so as to determine an optimal wriststrap configuration on the basis of the at least one morphological data item acquired by the determination system 11.

Finally, in this alternative, the invention also relates to a computer program containing instructions which, when the program is executed, cause this program to implement at least the intermediate step of determining at least one optimal configuration c* for the wriststrap described previously, so as to determine an optimal wriststrap configuration on the basis of the at least one morphological data item acquired by the determination system 11.

The invention claimed is:

1. A method for determining at least one morphological data item pertaining to a wriststrap wearer so as to prepare a wristwatch wriststrap to take the at least one morphological data item into consideration, wherein the method comprises:
   (i) acquiring at least one morphological data item pertaining to the wearer of the wriststrap from an acquisition device of a determination system provided with at least one sensor, configured to perform at least one selected from the group consisting of scanning, photographing and filming at least a portion of the wrist of the wearer, at least a portion of the hand of the wearer, or both at least a portion of the wrist and at least a portion of the hand of the wearer,
   wherein the determination system is set up to receive waves so as to acquire at least one morphological characteristic of the wearer of the wriststrap in a first operation of acquiring the at least one morphological characteristic, and
   wherein the at least one morphological data item is at least one of the following dimensions:
      a circumference of a wearer wrist portion likely to accommodate the wristwatch, of a wearer hand portion, or of both a wearer wrist portion likely to accommodate the wristwatch and a wearer hand portion,
      a height of a wearer wrist portion likely to accommodate the wristwatch, of a wearer hand portion, or of both a wearer wrist portion likely to accommodate the wristwatch and a wearer hand portion,
      a width of a wearer wrist portion likely to accommodate the wristwatch, of a wearer hand portion, or of both a wearer wrist portion likely to accommodate the wristwatch and a wearer hand portion, and
   (ii) determining of at least one optimal configuration of the wriststrap suited to the wearer, wherein:
      the determining comprises identifying in a database of a configuration system wriststrap configuration data best suited to the at least one morphological data item, and/or
      the determining comprises determining configuration data using at least one of the following:
         determining a type of wriststrap;
         determining a wriststrap strand or strands;
         determining a wriststrap clasp:
         determining a number of links or linkages for at least one strand of the wriststrap;
         determining configuration or configurations of at least one link or of at least one linkage for at least one wriststrap strand;
         determining a positioning of an end linkage of a wriststrap strand relative to a wriststrap clasp, relative to a watch case, or relative to both a wristrap clasp and a watch case;
         determining one or more configurations of a wriststrap clasp;
         determining a length adjustment or adjustments within a wriststrap clasp.

2. The method for determining at least one morphological data item pertaining to a wriststrap wearer as claimed in claim 1, wherein the acquiring of the at least one morphological data item pertaining to the wearer of the wriststrap comprises acquiring the dimension of the wearer wrist portion likely to accommodate the wristwatch, of the wearer hand portion, or of both the wearer wrist portion likely to accommodate the wristwatch and the wearer hand portion by implementing at least one of the following:
   providing, by a man-machine interface, an indication representing a digital model, obtained by the acquiring of the at least one morphological data item pertaining to the wearer of the wriststrap, of the at least one wrist, the at least one hand portion, or both the at least one wrist and the at least one hand portion to be considered; or
   positioning an indicator on the wrist of the wearer, on the hand of the wearer, or on both the wrist and the hand of the wearer, during the acquiring of the at least one morphological data item pertaining to the wearer of the wriststrap, to indicate the at least one portion to be considered;
   automatically determining, by a computer, the at least one wrist portion, the at least one hand portion, or both the at least one wrist portion and the at least one hand portion to be considered, on a digital model obtained by the acquiring of the at least one morphological data item pertaining to the wearer of the wriststrap, from a measurement of at least a distance from a point identified on the digital model.

3. The method for determining at least one morphological data item pertaining to a wriststrap wearer as claimed in claim 1, wherein the acquiring of the at least one morphological data item pertaining to the wearer of the wriststrap comprises a first operation of acquiring at least one morphological characteristic of the wearer of the wrist, and a second operation of determining the at least one morphological data item from the at least one morphological characteristic acquired during the first operation.

4. The method for determining at least one morphological data item pertaining to a wriststrap wearer as claimed in claim 3, wherein the at least one morphological characteristic comprises at least one of the following:
one or more digital models of a wearer wrist, of a wearer hand portion, or of both a wearer wrist and hand portion,
data pertaining to a positioning of several points of a wearer wrist, of a wearer hand portion, or of both a wearer wrist and a wearer hand portion.

5. The method for determining at least one morphological data item pertaining to a wriststrap wearer as claimed in claim 3, wherein the second operation of determining the at least one morphological data item comprises calculating a dimension from one or more digital models of at least one wearer wrist portion or of the position of several points acquired by the first operation.

6. The method for determining at least one morphological data item pertaining to a wriststrap wearer as claimed in claim 5, wherein the second operation of determining the at least one morphological data item comprises calculating by extrapolation any portions not acquired during the first operation.

7. The method for determining at least one morphological data item pertaining to a wriststrap wearer according to claim 3, wherein the acquiring of the at least one morphological data item pertaining to the wearer of the wriststrap includes automatically determining, by a computer, the at least one wrist portion, the at least one hand portion, or both the at least one wrist portion and the at least one hand portion to be considered, on a digital model obtained by the acquiring of the at least one morphological data item pertaining to the wearer of the wriststrap, from a measurement of at least a distance from a point identified on the digital model,
wherein the point identified is an end of the hand or a joint in the wrist.

8. A method for configuring a wristwatch wriststrap, wherein the method comprises:
implementing the method for determining at least one morphological data item pertaining to a wriststrap wearer as claimed in claim 1,
wherein the determining, includes determining the at least one optimum configuration of the wriststrap suited to the wearer, from the at least one morphological data item, automatically using a computer program of a configuration system, and
preparing the wriststrap for the wearer taking into account the at least one morphological data item and an optimal configuration determined in the determining of the at least one optimum configuration of the wriststrap.

9. The method for configuring a wristwatch wriststrap as claimed in claim 8, wherein the method for configuring comprises acquiring at least one wearer preference data item including at least one of the following:
a data item pertaining to a manner in which the wearer wishes the wriststrap to encircle his or her wrist,
a data item pertaining to a lifestyle of the wearer,
a data item pertaining to a preference as to type of wriststrap,
wherein the preparing of the wriststrap for the wearer is performed while taking the at least one wearer preference data item into consideration.

10. The method for configuring a wriststrap as claimed in claim 8, determining of the at least one optimal configuration of the wriststrap comprises identifying in a database of a configuration system wriststrap configuration data best suited to the at least one morphological data item.

11. The method for configuring a wristwatch wriststrap as claimed in claim 8, wherein the determining of the at least one optimal configuration of the wriststrap comprises at least determining a length adjustment of the wriststrap.

12. The method for configuring a wristwatch wriststrap as claimed in claim 8, wherein the determining of the at least one optimal configuration of the wriststrap comprises determining configuration data using at least one of the following:
determining a type of wriststrap;
determining a wriststrap strand or strands;
determining a wriststrap clasp;
determining a number of links or linkages for at least one strand of the wriststrap;
determining a configuration or configurations of at least one link or of at least one linkage for at least one wriststrap strand;
determining a positioning of an end linkage of a wriststrap strand relative to a wriststrap clasp, relative to a watch case, or relative to both a wristrap clasp and a watch case;
determining one or more configurations of a wriststrap clasp;
determining a length adjustment or adjustments within a wriststrap clasp.

13. A method for manufacturing a wristwatch, wherein the method comprises:
selecting a wristwatch, a watch case, or both a wristwatch and a watch case, and
configuring a wriststrap on the watch case to a configuration established by the method for configuring a wriststrap as claimed in claim 8.

14. The method according to claim 1, wherein the sensor includes at least one selected from the group consisting of a camera, a laser, and a lens.

15. The method for determining at least one morphological data item pertaining to a wriststrap wearer as claimed in claim 1, wherein the determining of the at least one optimal configuration of the wriststrap comprises at least determining a length adjustment of the wriststrap.

16. A system for determining at least one morphological data item pertaining to a wriststrap wearer, wherein the system comprises:
at least an acquisition device provided with at least one sensor, configured to perform at least one of selected from the group consisting of scanning, photographing, and filming at least one portion of a wrist, at least one portion of a hand of the wearer, or both at least one portion of the wrist of the wearer and at least one portion of the hand of the wearer,
wherein the determination system is set up to receive waves so as to acquire at least one morphological characteristic of the wearer of the wriststrap, and
wherein the determination system is configured to implement a method for determining at least one morphological data item pertaining to a wriststrap wearer so as to prepare a wristwatch wriststrap to take the at least one morphological data item into consideration, wherein the method comprises:
acquiring at least one morphological data item pertaining to the wearer of the wriststrap from an acquisition device of a determination system provided with at least one sensor, configured to perform at least one selected from the group consisting of scanning, photographing and filming at least a portion of the wrist of the wearer, at least a portion of the hand of the wearer, or both at least a portion of the wrist and at least a portion of the hand of the wearer, wherein the determination system is set up to receive waves so as to acquire at least one morphological characteristic of the wearer of the wriststrap in a first operation of acquiring the at least one morphological characteristic, and wherein the at least one morphological data item is at least one of the following dimensions:
- a circumference of a wearer wrist portion likely to accommodate the wristwatch, of a wearer hand portion, or of both a wearer wrist portion likely to accommodate the wristwatch and a wearer hand portion,
- a height of a wearer wrist portion likely to accommodate the wristwatch, of a wearer hand portion, or of both a wearer wrist portion likely to accommodate the wristwatch and a wearer hand portion,
- a width of a wearer wrist portion likely to accommodate the wristwatch, of a wearer hand portion, or of both a wearer wrist portion likely to accommodate the wristwatch and a wearer hand portion, wherein the system comprises a first portion having, an annular or substantially annular shape or an elliptical or substantially elliptical shape adapted to encompass a wrist portion, a hand portion, or both a wrist portion and a hand portion of a wearer, comprising an acquisition device, wherein the acquisition device comprises several emitters/receivers adapted to automatically acquire the at least one morphological characteristic of at least the wrist portion, at least the hand portion, or at least both the wrist portion and the hand portion.

17. The system for determining at least one morphological data item pertaining to a wriststrap wearer as claimed in claim 16, wherein the system comprises a computer configured to calculate at least one morphological data item from at least one morphological characteristic acquired by the acquisition device.

18. The system for determining at least one morphological data item pertaining to a wriststrap wearer as claimed in claim 16, wherein the system is integrated into at least one of the following:
- a mobile telephone of the smartphone type,
- a tablet,
- spectacles,
- equipment comprising a first portion of substantially annular or elliptical shape adapted to encompass a wrist portion, a hand portion, or both a wrist portion and a hand portion of a wearer.

19. The system according to claim 16, wherein the sensor includes at least one selected from the group consisting of a camera, a laser, and a lens.

20. The system for determining at least one morphological data item pertaining to a wriststrap wearer as claimed in claim 16, wherein the system is portable.

\* \* \* \* \*